United States Patent
Lee et al.

(10) Patent No.: US 9,503,760 B2
(45) Date of Patent: Nov. 22, 2016

(54) METHOD AND SYSTEM FOR SYMBOL BINARIZATION AND DE-BINARIZATION

(71) Applicant: MEDIATEK INC., Hsin-Chu (TW)

(72) Inventors: Kun-Bin Lee, Taipei (TW); Han-Liang Chou, Hsinchu (TW); Ting-An Lin, Hsinchu (TW); Yi-Hau Chen, Taipei (TW); Chi-Cheng Ju, Hsinchu (TW); Yen-Chieh Lai, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 770 days.

(21) Appl. No.: 13/968,361

(22) Filed: Aug. 15, 2013

(65) Prior Publication Data

US 2015/0049819 A1   Feb. 19, 2015

(51) Int. Cl.
*H04N 19/91* (2014.01)
*H04N 19/13* (2014.01)
*H04N 19/169* (2014.01)

(52) U.S. Cl.
CPC .............. *H04N 19/91* (2014.11); *H04N 19/13* (2014.11); *H04N 19/1887* (2014.11)

(58) Field of Classification Search
CPC .............................. H04N 19/91; H04N 19/13
USPC ....................................................... 375/240.23
See application file for complete search history.

(56) References Cited

U.S. PATENT DOCUMENTS

| | | | |
|---|---|---|---|
| 2013/0188727 A1* | 7/2013 | Lou ........................ | H04N 19/13 375/240.18 |
| 2013/0202029 A1* | 8/2013 | Lou ........................ | H04N 19/91 375/240.03 |

* cited by examiner

*Primary Examiner* — Dave Czekaj
*Assistant Examiner* — Shanika Brumfield
(74) *Attorney, Agent, or Firm* — Winston Hsu; Scott Margo (57) ABSTRACT

A method of binarizing an input symbol using a hybrid Truncated Rice/k-th order exp-Golomb binarization scheme with a Rice Parameter includes: determining a threshold; comparing the input symbol with the threshold; constructing a codeword using a Truncated Rice (TR) binarization process for the input symbol when a comparison result belongs to a first type of comparison result; and constructing a codeword with an initial prefix and a suffix for the input symbol when the comparison result belongs to a second type of comparison result; wherein the suffix is constructed using an exp-Golomb binarization process.

20 Claims, 9 Drawing Sheets

| Rice Parameter | 0 | 1 | 2 | 3 | 4 |
|---|---|---|---|---|---|
| Input symbol | Codeword | Codeword | Codeword | Codeword | Codeword |
| 0 | 0 | 0 0 | 0 00 | 0 000 | 0 0000 |
| 1 | 10 | 0 1 | 0 01 | 0 001 | 0 0001 |
| 2 | 110 | 10 0 | 0 10 | 0 010 | 0 0010 |
| 3 | 1110 | 10 1 | 0 11 | 0 011 | 0 0011 |
| 4 | 11110 | 110 0 | 10 00 | 0 100 | 0 0100 |
| 5 | 111101 | 110 1 | 10 01 | 0 101 | 0 0101 |
| ... | ...... | ...... | ...... | ...... | ...... |
| 8 | 11111010 | 111 0 00 | 110 00 | 10 000 | 0 1000 |
| ... | ...... | ...... | ...... | ...... | ...... |
| 15 | 1111110101 | 1111 10011 | 1110 11 | 10 111 | 0 1111 |

| cRP | cTRMax |
|---|---|
| 0 | 4 |
| 1 | 8 |
| 2 | 16 |
| 3 | 32 |
| 4 | 64 |

FIG. 1 RELATED ART

| cRP | cTRMax |
|---|---|
| 0 | 4 |
| 1 | 8 |
| 2 | 16 |
| 3 | 32 |
| 4 | 64 |

| Rice Parameter | 0 | 1 | 2 | 3 | 4 |
|---|---|---|---|---|---|
| Input symbol | Codeword | Codeword | Codeword | Codeword | Codeword |
| 0 | 0 | 0 0 | 0 00 | 0 000 | 0 0000 |
| 1 | 10 | 0 1 | 0 01 | 0 001 | 0 0001 |
| 2 | 110 | 10 0 | 0 10 | 0 010 | 0 0010 |
| 3 | 1110 | 10 1 | 0 11 | 0 011 | 0 0011 |
| 4 | 11110 | 110 0 | 10 00 | 0 100 | 0 0100 |
| 5 | 111101 | 110 1 | 10 01 | 0 101 | 0 0101 |
| ... | ... | ... | ... | ... | ... |
| 8 | 1111 1010 | 111 000 | 110 00 | 10 000 | 0 1000 |
| ... | ... | ... | ... | ... | ... |
| 15 | 1111 110101 | 1111 10011 | 1110 11 | 10 111 | 0 1111 |

FIG. 2A

| cRP | cTRMax |
|---|---|
| 0 | 7 |
| 1 | 14 |
| 2 | 26 |
| 3 | 46 |
| 4 | 78 |

| Rice Parameter | 0 | 1 | 2 | 3 | 4 |
|---|---|---|---|---|---|
| Input symbol | Codeword | Codeword | Codeword | Codeword | Codeword |
| 0 | 0 | 00 | 000 | 0000 | 00000 |
| 1 | 10 | 01 | 001 | 0001 | 00001 |
| 2 | 110 | 100 | 010 | 0010 | 00010 |
| 3 | 1110 | 101 | 011 | 0011 | 00011 |
| 4 | 1111 0 | 1100 | 1000 | 0100 | 00100 |
| ... | ...... | ...... | ...... | ...... | ...... |
| 8 | 1111 1111 | 111 00 | 11 000 | 100 00 | 01000 |
| ... | ...... | ...... | ...... | ...... | ...... |
| 15 | 1111 1111 1110 000 | 1111 1111 | 111 011 | 10 111 | 01111 |

FIG. 2B RELATED ART

| kth order EG | 0 | 1 | 2 | 3 | 4 |
|---|---|---|---|---|---|
| Input symbol | Codeword | Codeword | Codeword | Codeword | Codeword |
| 0 | 0 | 0 0 | 0 00 | 0 000 | 0 0000 |
| 1 | 100 | 0 1 | 0 01 | 0 001 | 0 0001 |
| 2 | 101 | 100 0 | 0 10 | 0 010 | 0 0010 |
| 3 | 11000 | 100 1 | 0 11 | 0 011 | 0 0011 |
| 4 | 11001 | 101 0 | 100 00 | 0 100 | 0 0100 |
| 5 | 11010 | 101 1 | 100 01 | 0 101 | 0 0101 |
| 6 | 11011 | 11000 0 | 100 10 | 0 110 | 0 0110 |
| 7 | 1110000 | 11000 1 | 100 11 | 0 111 | 0 0111 |
| 8 | 1110001 | 11001 0 | 101 00 | 100 000 | 0 1000 |
| 9 | 1110010 | 11001 1 | 101 01 | 100 001 | 0 1001 |
| 10 | 1110011 | 11010 0 | 101 10 | 100 010 | 0 1010 |
| 11 | 1110100 | 11010 1 | 101 11 | 100 011 | 0 1011 |
| 12 | 1110101 | 11011 0 | 11000 00 | 100 100 | 0 1100 |
| 13 | 1110110 | 11011 1 | 11000 01 | 100 101 | 0 1101 |
| 14 | 1110111 | 1110000 0 | 11000 10 | 100 110 | 0 1110 |
| 15 | 111100000 | 1110000 1 | 11000 11 | 100 111 | 0 1111 |

FIG. 2C

| Rice Parameter | 0 | 1 | 2 | 3 | 4 |
|---|---|---|---|---|---|
| Input symbol | Codeword | Codeword | Codeword | Codeword | Codeword |
| 0 | 0 | 0 0 | 0 00 | 0 000 | 0 0000 |
| 1 | 10 | 0 1 | 0 01 | 0 001 | 0 0001 |
| 2 | 110 | 10 0 | 0 10 | 0 010 | 0 0010 |
| 3 | 1110 | 10 1 | 0 11 | 0 011 | 0 0011 |
| 4 | 1111 0 0 | 110 0 | 10 00 | 0 100 | 0 0100 |
| 5 | 1111 0 1 | 110 1 | 10 01 | 0 101 | 0 0101 |
| 6 | 1111 100 0 | 1110 0 | 10 10 | 0 110 | 0 0110 |
| 7 | 1111 100 1 | 1110 1 | 10 11 | 0 111 | 0 0111 |
| 8 | 1111 101 0 | 1111 0 00 | 110 00 | 10 000 | 0 1000 |
| 9 | 1111 101 1 | 1111 0 01 | 110 01 | 10 001 | 0 1001 |
| 10 | 1111 11000 0 | 1111 0 10 | 110 10 | 10 010 | 0 1010 |
| 11 | 1111 11000 1 | 1111 0 11 | 110 11 | 10 011 | 0 1011 |
| 12 | 1111 11001 0 | 1111 100 00 | 1110 00 | 10 100 | 0 1100 |
| 13 | 1111 11001 1 | 1111 100 01 | 1110 01 | 10 101 | 0 1101 |
| 14 | 1111 11010 0 | 1111 100 10 | 1110 10 | 10 110 | 0 1110 |
| 15 | 1111 11010 1 | 1111 100 11 | 1110 11 | 10 111 | 0 1111 |

FIG. 2D

| Rice Parameter | 0 | 1 | 2 | 3 | 4 |
|---|---|---|---|---|---|
| Input symbol | Codeword | Codeword | Codeword | Codeword | Codeword |
| 0 | 0 | 0　0 | 0　00 | 0　000 | 0　0000 |
| 1 | 10 | 0　1 | 0　01 | 0　001 | 0　0001 |
| 2 | 110 | 10　0 | 0　10 | 0　010 | 0　0010 |
| 3 | 111　0 | 10　1 | 0　11 | 0　011 | 0　0011 |
| 4 | 111　100 | 110　0 | 10　00 | 0　100 | 0　0100 |
| 5 | 111　101 | 110　1 | 10　01 | 0　101 | 0　0101 |
| 6 | 111　11000 | 111　0　0 | 10　10 | 0　110 | 0　0110 |
| 7 | 111　11001 | 111　0　1 | 10　11 | 0　111 | 0　0111 |
| 8 | 111　11010 | 111　100　0 | 110　00 | 10　000 | 0　1000 |
| 9 | 111　11011 | 111　100　1 | 110　01 | 10　001 | 0　1001 |
| 10 | 111　1110000 | 111　101　0 | 110　10 | 10　010 | 0　1010 |
| 11 | 111　1110001 | 111　101　1 | 110　11 | 10　011 | 0　1011 |
| 12 | 111　1110010 | 111　11000　0 | 111　0　00 | 10　100 | 0　1100 |
| 13 | 111　1110011 | 111　11000　1 | 111　0　01 | 10　101 | 0　1101 |
| 14 | 111　1110100 | 111　11001　0 | 111　0　10 | 10　110 | 0　1110 |
| 15 | 111　1110101 | 111　11001　1 | 111　0　11 | 10　111 | 0　1111 |

METHOD AND SYSTEM FOR SYMBOL BINARIZATION AND DE-BINARIZATION

BACKGROUND

Digital television and video streaming technology has enabled people, no matter where they live, to have access to huge amounts of information. Although video typically takes up a large amount of space, digital compression techniques mean that many megabytes of data can be transmitted in the form of stored files as well as real-time data (live streaming). The applications of this technology are far reaching: high quality live streaming has seen its most recent application in the Middle East, where world changing events have been documented and transmitted all over the world almost as soon as they happen.

Digital compression falls into two types: lossless and lossy compression. Lossy compression involves compressing the video data so that the compressed file has less data than the original data. When the file is received and viewed, there will therefore be a loss of quality compared to the original footage. Lossless compression, as indicated by the name, can compress a file so that it includes almost the same amount of data as the original data, thereby preserving the quality. Current examples of coding standards employing lossless compression are MPEG-4 and H.264, which are the leading standards used in high-definition video.

As all information must be preserved in lossless compression, compression techniques which can reduce the size of a file to be transmitted are very important. H.264 is able to perform almost lossless compression by taking advantage of Variable Length Coding (VLC) and Context Adaptive Binary Arithmetic Coding (CABAC) which can render information digitally at low bit rates. CABAC transforms data into bits, encodes them as binary symbols, and applies multiple probability models to the binary symbols which are selected adaptively. A number of binarization techniques can be used. Unary binarization is a technique which converts a codeword into a string of ONES followed by a terminating ZERO. This has the advantage of making each codeword uniquely distinguishable but larger codewords will be very long, as the number of bins depends on the size of the largest value. An alternative binarization method is Exponential-Golomb (exp-Golomb) binarization wherein a codeword is split into a unary prefix and a binary suffix. This form of binarization reduces the number of bins which need to be sent through a binary arithmetic coder (BAC), but has the disadvantage of being unable to quickly distinguish between smaller and larger codewords.

In order to exploit the positive aspects of both systems of binarization, hybrid binarization schemes are often used. For HEVC coding, which is the next generation coding standard beyond H.264 and MPEG-4, a hybrid Rice binarization scheme is used. The binarization consists of a prefix part and (when present) a suffix part. The prefix part of the binarization is derived by invoking the TR binarization process. When the prefix bit string does not fit in with a predefined criterion, a suffix bin string will be created by using the EGk binarization. For example, when the prefix bin string is equal to the bit string of length 4 with all bits equal to 1, the bin string consists of a prefix bin string and a suffix bin string. The suffix bin string is derived using the EGk binarization.

Figure 2A:
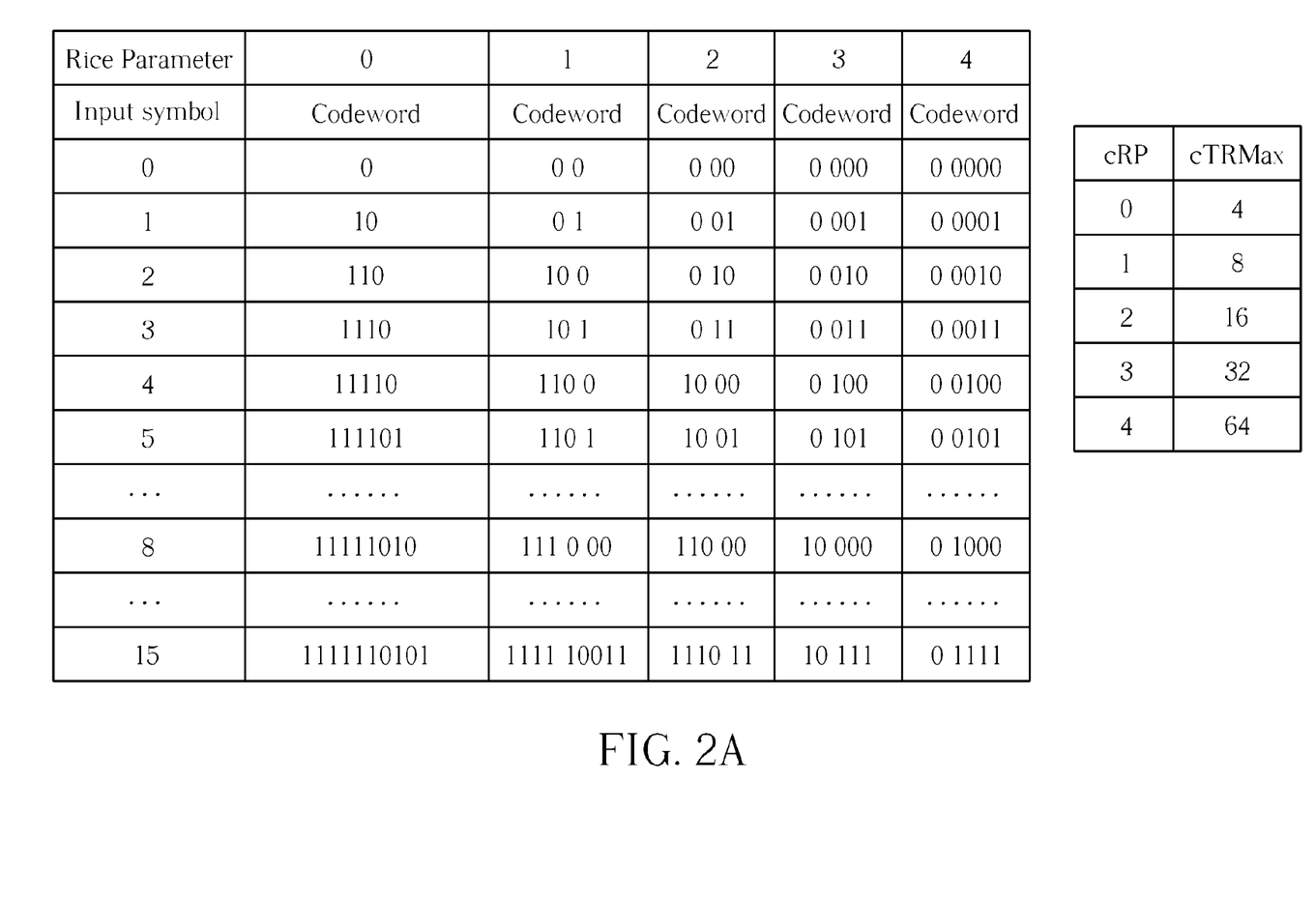
FIGS. 2A and 2B are tables illustrating input symbols coded using a hybrid Truncated Rice, exp-Golomb binarization scheme for different Rice Parameter.
Figure 2B:
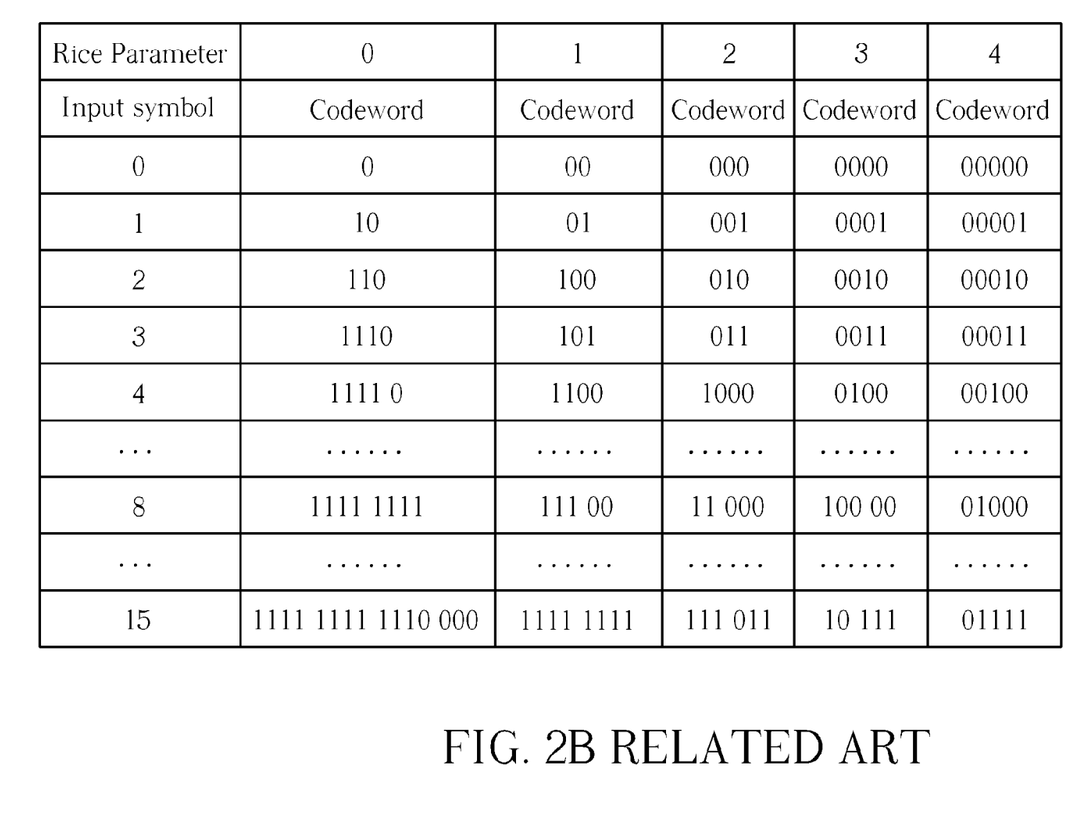

In the EGk binarization scheme, the Rice parameter is used to divide the suffix into a quotient and a remainder, and k is defined by the Rice parameter. The quotient part will be coded using unary binarization and the remainder will be coded in binary. Thus, a codeword representing a value above the threshold can be said to consist of a $1^{st}$ portion (initial prefix), a $2^{nd}$ portion (quotient) and a $3^{rd}$ portion (remainder). FIG. 2A and FIG. 2B are exemplary tables illustrating input symbols coded using a hybrid Truncated Rice, exp-Golomb binarization scheme for different values of Rice Parameter for EGk and EG0 respectively.

Please note that all codewords shown in the table of FIG. 2.A (apart from the codeword for input symbol above 4 for a Rice Parameter equal to 0 and input symbol above 8 for a Rice Parameter equal to 1) are binarized using a TR binarization only; in other words, the codeword only consists of an initial prefix. Similarly, all codewords shown in the table of FIG. 2.B (apart from the codeword for input symbol above 7 and 14 for Rice Parameter equal to 0 and 1, respectively) are binarized using a TR binarization only. TR binarization codes an input symbol as a codeword having a prefix and a suffix, wherein the suffix can be directly selected from the least significant bits of the input symbol in binary form. The number of least significant bits will be defined by the Rice Parameter. The number of bins of the prefix is then defined by the decimal value of the most significant bits. An example will be given for the input symbol 12, and assuming a Rice Parameter of two (i.e. cRP=2). The input symbol is first converted into binary to give the value '1100'. The cRP least significant bits of this binary value are '00'; these two bits will form the suffix of the codeword. The value '1100' is then right shifted by two (the number of bits of the suffix) to obtain the value '11'. This value is converted back to decimal, i.e. '3'. Therefore, the prefix part of the codeword consists of three ONES with a truncating ZERO (i.e., '1110'. The input symbol 12 coded using a Truncated Rice with cRP=2 therefore gives '1110 00'. The values 13-15 also yield '3' in decimal when they are right shifted by cRP bits, i.e. their most significant bits are all the same. Their corresponding TR codewords are '1110 01', '1110 10' and '1110 11'. Another example will be given for the same input symbol 12, but assuming a Rice Parameter of one (i.e. cRP=1). The input symbol is first converted into binary to give the value '1100'. The cRP least significant bit of this binary value is '0'; this single bit will form the suffix of the codeword. The value '1100' is then right shifted by one (the number of bits of the suffix) to obtain the value '110'. This value is converted back to decimal, i.e. '6'. Therefore, the prefix part of the codeword consists of six ONES with a truncating ZERO, i.e. '1111110'. The input symbol 12 coded using a Truncated Rice with cRP=1 therefore gives '1111110 0'. In this case, however, the final codeword could be too long and therefore EGk with prefix could be applied. As indicated in FIG. 2D, the input symbol 12 with a Rice Parameter of one is coded by '1111 100 00' in which its codeword length is shorter compared with the TR code. A preferred embodiment would check the length of the TR codeword in order to decide whether to use TR code or switch to an EGk base codeword with an initial prefix. Another preferred embodiment would check the number of ONES in the prefix part of the TR codeword. If this number is larger than a predefined criterion, the input symbol would be coded by EGk with an initial codeword. This number of ONES is 4 and 3 in the FIG. 2D and FIG. 2E, respectively. Please note that, when the Rice Parameter is zero, the corresponding codewords are equivalent to input symbols coded using a Truncated unary binarization.

Figure 1:
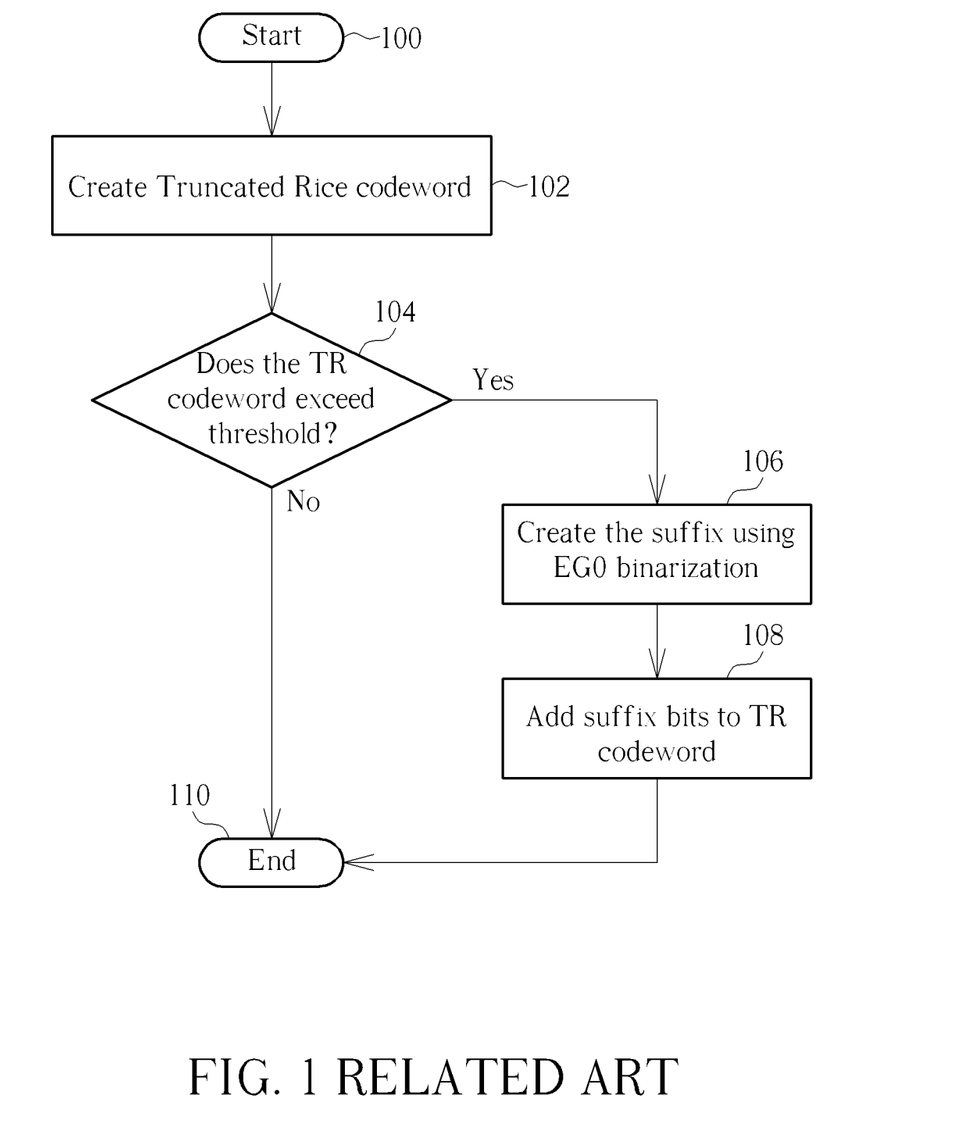
FIG. 1 is a flowchart illustrating a method of coding an input symbol into a Truncated Rice codeword according to the conventional art.

Conventional methods of coding an input symbol according to the above hybrid binarization scheme consist of first creating a codeword using Truncated Rice binarization, determining whether the prefix bit string does not fit in with a predefined criterion, and if so, creating a suffix bin string by using the above described EGk binarization. Another conventional method first creates a prefix codeword by using the TR binarization process. When the prefix bin string has more than the bit string of a predefined length (e.g. 4 in FIG. 2D and 3 in FIG. 2E respectively) with all bits equal to 1, the suffix bin string is present. In this case, only a fixed number of ONES are output as the prefix. The suffix bin string is then generated by using the EGk binarization process with an input symbol minus a predefined value, where the predefined value is selected according to Rice Parameter. Exp-Golomb order k can be set according to the Rice Parameter. This aforementioned conventional process is illustrated in FIG. 1. The steps of FIG. 1 are detailed as follows.

Step 100: Start the coding process;
Step 102: Create prefix bit string of the Truncated Rice (TR) codeword;
Step 104: Does the prefix bit string fit in with a predefined criterion? If yes, go to Step 110; if no, go to Step 106;
Step 106: Create a suffix bin string of the codeword and code the suffix using an EGk binarization scheme;
Step 108: Add the suffix bin string to the prefix bit string of the TR codeword;
Step 110: End.

Both the Rice Parameter and the predefined criterion may be constantly updated according to the input symbols being coded. The present invention therefore aims to provide a more direct method of coding.

SUMMARY

A method of binarizing an input symbol using a hybrid Truncated Rice/k-th order exp-Golomb binarization scheme with a Rice Parameter comprises: determining a first threshold; comparing the input symbol with the first threshold; constructing a codeword using a Truncated Rice (TR) binarization process for the input symbol when a comparison result belongs to a first type of comparison result; and constructing a codeword with an initial prefix and a suffix for the input symbol when the comparison result belongs to a second type of comparison result; wherein the suffix is constructed using an exp-Golomb binarization process.

Another method for generating an index value from a codeword for digital video decoding comprises: determining whether the codeword contains a first pattern; when the codeword contains the first pattern, decoding a remaining part of the codeword by using an exp-Golomb binarization process; and when the codeword does not contain the first pattern, decoding the entire codeword using a Truncated Rice (TR) binarization process.

Another method for generating an index value from a codeword for digital video decoding comprises the steps of: determining a selected threshold in response to a first portion of said codeword having a first pattern, wherein the selected threshold is based on a Rice Parameter; generating an offset based on a second pattern in a second portion of the codeword following the first portion in response to the first portion having the first pattern; generating a value based on a third pattern in a third portion of the codeword following the second portion in response to the first portion having the first pattern; combining the selected threshold, the offset, and the value to generate the index value; and updating the Rice Parameter based on the generated index value.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIG. 2A, which illustrates a series of input symbols coded using a hybrid binarization scheme for Rice Parameters from zero to four. As shown in the second column of the table, when the Rice Parameter (cRP) equals zero, the threshold below which input symbols are coded using a Truncated Rice (TR) binarization (cTRMax) is 4; when the Rice Parameter is equal to one, the threshold below which input symbols are coded using a Truncated Rice (TR) binarization is 8; when the Rice Parameter is equal to two, the threshold below which input symbols are coded using a Truncated Rice (TR) binarization is 16; when the Rice Parameter is equal to three, the threshold below which input symbols are coded using a Truncated Rice (TR) binarization is 32; and when the Rice Parameter is equal to four, the threshold below which input symbols are coded using a Truncated Rice (TR) binarization is 64. Further, when the Rice Parameter is equal to zero, the TR binarization for input symbols below the threshold is equivalent to a Truncated Unary binarization scheme. Similarly, in the case of FIG. 2B, the threshold below which input symbols are coded using a TR binarization is 7, 14, 26, 46, and 78, respectively, for the Rice Parameter equal to zero, one, two, three and four.

Figure 2C:
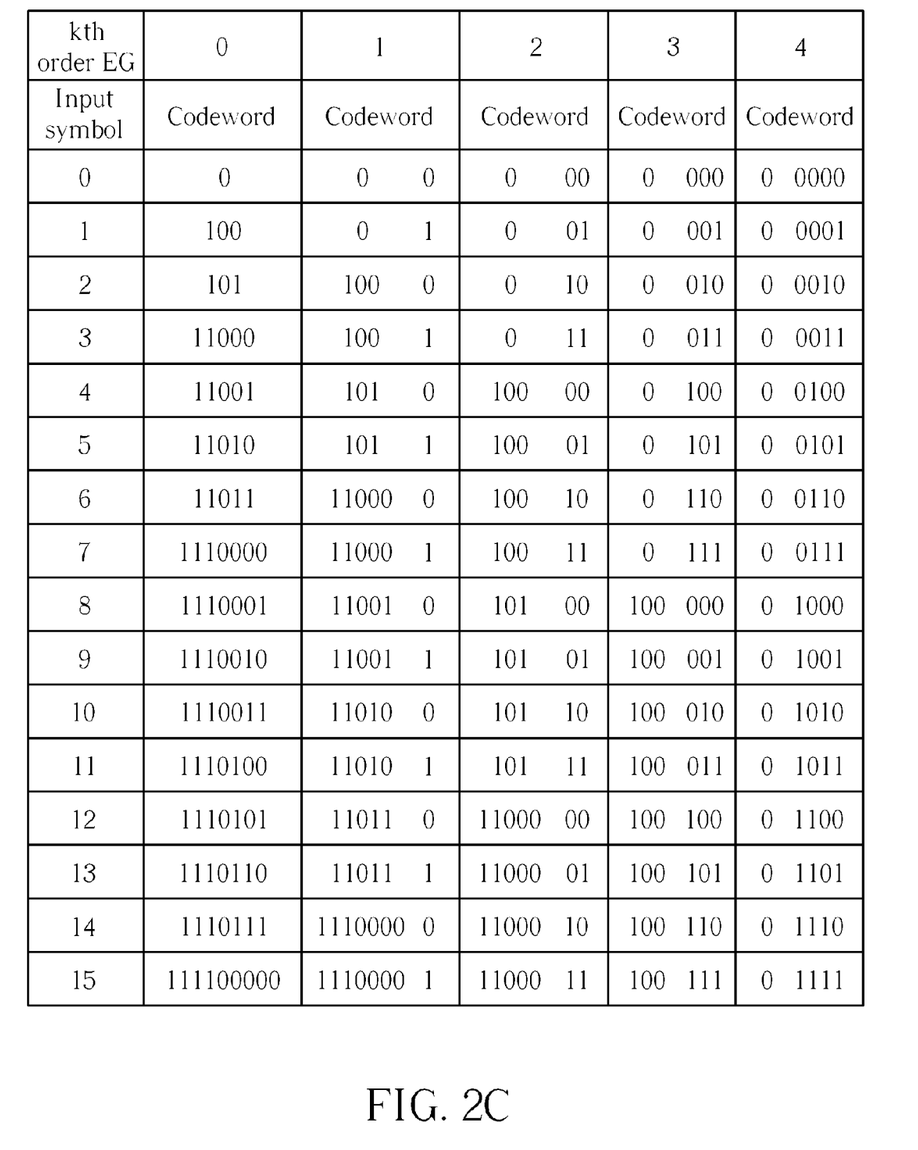
FIG. 2C is a table illustrating input symbols coded using exponential Golomb scheme.
Figure 2D:
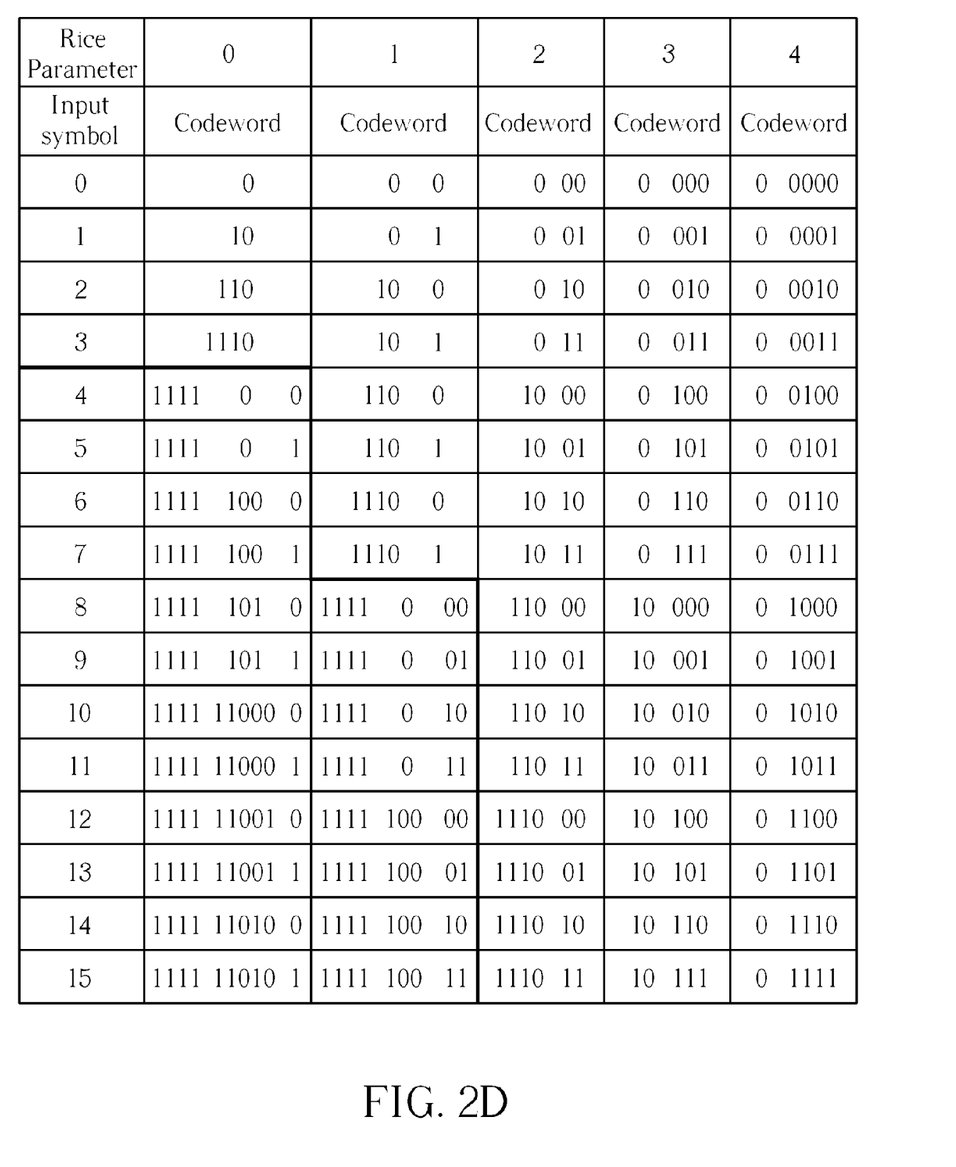
FIGS. 2D and 2E are tables representing FIG. 2A with prefix consisting of four ONEs and three ONEs, respectively.
Figure 2E:
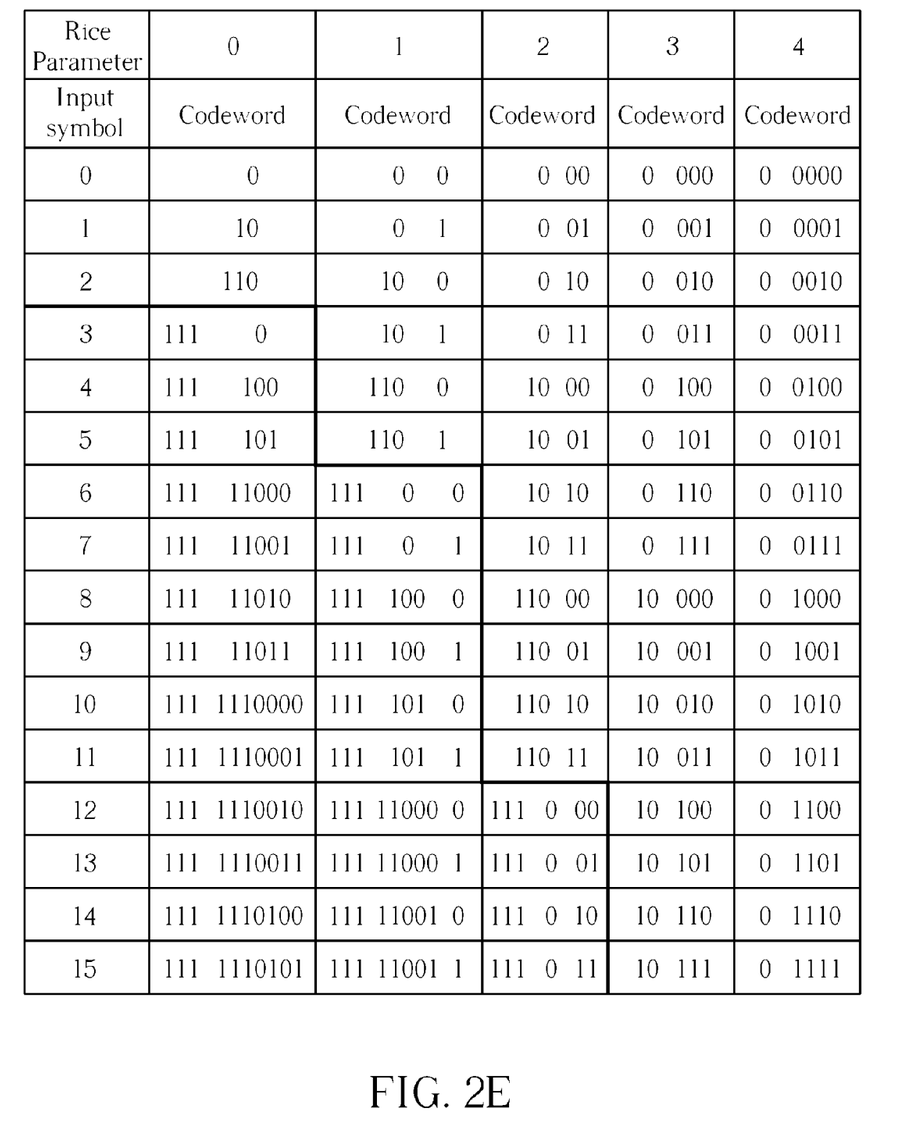

Furthermore, when the input symbols are equal to or larger than the threshold, the input can be coded using a prefix and a suffix. The suffix can be coded by either EGk coding alone, or EG0 followed by a suffix. FIG. 2C illustrates some EGk codes for k=0~4. FIG. 2D and FIG. 2E illustrate representations of FIG. 2A with different prefix types. From looking at the second column of the table in FIG. 2D, it can be observed that any input symbol above the threshold will have an initial prefix consisting of four ONES, whereas when an input symbol is below the threshold, the created codewords will vary. Taking a Rice Parameter equal to zero as an example, input symbols above 3 (e.g. 4, 5, etc.) will have an initial prefix consisting of four ONES and a suffix coded by EGK code where K=1. Taking a Rice Parameter equal to one as an example, input symbols above 7 (e.g. 8, 9, 10, etc.) will have an initial prefix consisting of four ONES and a suffix coded by EGK code where K=2. For input symbol 12 with Rice Parameter equal to one, the threshold is 8. The codeword suffix is coded by using an EG2 function with an input equal to 4 (derived by the difference between the input symbol and the threshold, 12−8). By looking at FIG. 2C, the corresponding codeword is '100 00'. Hence, the final codeword CW-2D is '1111 100 00'. Similarly, when the Rice Parameter equals zero, as illustrated in the table of FIG. 2E, input symbols above 2 (e.g. 3, 4, etc.) will have an initial prefix consisting of three ONES and a suffix coded by EGK code where K=0. When the Rice Parameter equal one, as illustrated in the table of FIG. 2E, input symbols above 5 (e.g. 6, 7, 8, etc.) will have an initial prefix consisting of three ONES and a suffix coded by EGK code where K=1. For input symbol 12 with Rice Parameter equal to one, the threshold is 6. The codeword suffix is coded by using EG1 function with an input equal to 6 (derived by 12−6). By looking at FIG. 2C, the corresponding codeword is '11000 0'. Hence, the final codeword CW-2E is '111 11000 0'. The codewords CW-2D and CW-2E are actually the same.

For input symbol 12 with Rice Parameter equal to one (i.e. cRP=1), the threshold is 8 and its corresponding initial prefix is '1111'. The reminding codeword can then be generated by dividing its residual (12−8=4) into a quotient and a remainder according to the cRP. The quotient coded using EG0 binarization while the remainder is coded by binary fixed-length code and its length is according to cRP. In this case, cRP=1 and therefore its residual 4 can be right shifted by two (cRP+1) bits to generate quotient 1 and its corresponding EG0 code is '100' as shown in FIG. 2C. The reminder is derived by subtracting the residual by the quotient shifted left by two bits and the result is 0. This remainder is then represented as a length of cRP+1 binary fixed-length codeword '00'. The remainder may alternatively be selected from (cRP+1) bits of the least significant bits (LSB) of the input symbol in binary format. In this case, input symbol 12 has a binary format '1100' and its 2-bit LSB part is '00'. The remainder may alternatively be selected from (cRP+1) bits of the least significant bits of the residual value in binary format. In this case, residual 4 has a binary format '100' and its 2-bit LSB part is '00'. In brief, input symbol 12 with cRP=1 has an initial prefix '1111', EG0 codeword part '100', and a fixed-length codeword part '00'. Its entire codeword is '1111 100 00', which is the same as CW-2D and CW-2E. In summary, preferred methods generate the same codeword based on exp-Golomb binarization.

As mentioned before, when the input symbols are equal to or larger than the threshold, the input can also be coded using a prefix and a suffix where the suffix can be coded by EG0 followed by another suffix. From looking at the second column of the table in FIG. 2D, taking a Rice Parameter equal to one as an example, input symbols above 7 (e.g. 8, 9, 10, etc.) will have an initial prefix consisting of four ONES and EG0 code followed by a fixed-length coded 2-bit suffix in binary format. The length of a fixed-length codeword can be determined by the Rice Parameter. Taking FIG. 2D as an example, the length of the fixed-length codeword is 1, 2, 3, 4, 5 for Rice Parameter equal to 0, 1, 2, 3, 4 respectively.

Coding of smaller codewords is more efficient with smaller Rice Parameters, but larger codewords are more effectively coded with larger Rice Parameters. This is why the Rice Parameter (and therefore cTRMax) will be updated according to which input symbols are coded. From looking at the table of FIG. 2b, it can be observed that any input symbol above the threshold will have an initial prefix consisting of eight ONES, whereas below the threshold, the created codewords will vary.

Figure 3:
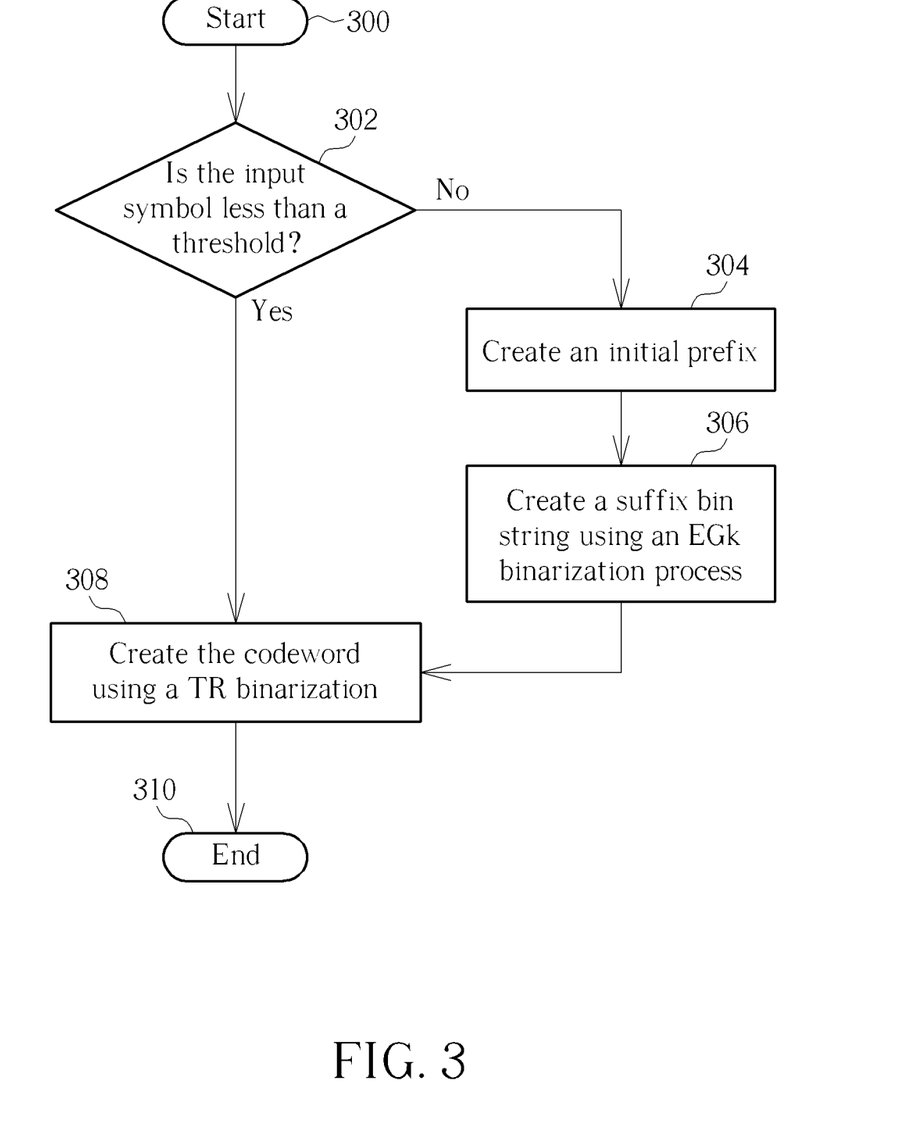
FIG. 3 is a flowchart illustrating a method of coding an input symbol according to an embodiment of the present invention.

As the threshold and Rice Parameter are variable, the present invention first proposes to determine whether an input symbol to be coded is above or below a current threshold. If the input symbol is below the threshold then the codeword can be directly created by using the above TR binarization. If, however, the input symbol is above the threshold, the initial prefix can be immediately created using a predefined pattern (e.g. a series of four ONEs). The suffix can then be determined by subtracting the threshold from the input symbol, and the above-described EGk binarization can be used to create the suffix part of the codeword. For input symbols above the threshold, no TR binarization needs to be considered, and the initial prefix can be created according to a set pattern. This method is illustrated in FIG. 3. The steps are as follows:

Step 300: Start;
Step 302: Is the input symbol less than a threshold? If yes, go to Step 308; if no, go to Step 304;
Step 304: Create an initial prefix;
Step 306: Create a suffix bin string using an EGk binarization process;
Step 308: Create the codeword using a TR binarization scheme;
Step 310: End.

As illustrated in FIG. 3, when it is determined that the input symbol is below the threshold, the codeword can be directly created using a Truncated Rice binarization scheme. When the input symbol is above the threshold, the initial prefix can be directly created according to a first pattern (e.g. a series of four ONES) and then an EGk binarization is used to create suffix bits.

The present invention can also be described as follows. The present invention first proposes to determine the way an input symbol is to be coded by comparing the input symbol with a threshold value which is selected according to a current Rice Parameter (cRP). If the comparison result indicates a first condition—for example, the input symbol is less than the threshold value—then a codeword is constructed using a Truncated Rice (TR) binarization process for said input symbol. If the comparison result indicates a second condition—for example, the input symbol is larger than or equal to the threshold value—then a codeword is constructed using an initial prefix and a suffix for said input symbol, wherein the suffix is constructed using an exp-Golomb binarization.

To be more specific, the method of selecting a threshold value may affect the method of comparing the input symbol with the selected threshold value. The second column of the table in FIG. 2D for the case where the Rice Parameter (cRP) is zero is taken as an example. When the threshold value is selected as 4, the result of comparing an input symbol 3 with the threshold value 4 indicates a first condition, i.e. that the input symbol is less than the selected threshold value. In this case, a TR binarization process is applied for input symbol 3. The result of comparing another input symbol 4 with the threshold value 4 indicates a second condition, i.e. that the input symbol is equal to the selected threshold value. In this case, an exp-Golomb binarization is applied for input symbol 4 (step 306) with an initial prefix (step 304).

In FIG. 2E, when the threshold value is selected as 3, the result of comparing the input symbol 3 with the threshold value 3 indicates a third condition—that the input symbol is equal to the selected threshold value. In this case, an exp-Golomb binarization is applied for input symbol 3 (step 306) with an initial prefix (step 304). The result of comparing another input symbol 4 with the threshold value 3 indicates a fourth condition—the input symbol is larger than the selected threshold value. In this case, an exp-Golomb binarization is still applied for input symbol 4 (step 306) with an initial prefix (step 304).

The present invention also provides a method for decoding a codeword using the hybrid binarization scheme. The method relies on the fact that, for every Rice Parameter and its corresponding threshold, input symbols equal to and above the threshold will contain a first pattern Pi (e.g. an initial prefix consisting of four ONES).

For the first pattern consisting of four ONES (herein designated as Pattern Pi), it is known that the input symbol must be equal to or above the threshold. The Rice Parameter and threshold will then be determined, and from this a first index value equivalent to the initial prefix can be derived. For example, if the cRP is 1, the initial prefix will be equal to 8. The suffix can then be derived using EGk decoding.

When pattern Pi is not found, a more complicated decoding flow is applied. In this case, if the Rice Parameter is equal to zero, the codeword is coded by a TR binarization and the codeword only consists of the quotient part. Therefore, the quotient is generated based on bit string pattern 1 in unary format. The value of the codeword will be equal to the derived quotient. For example, the codeword "110" does not contain pattern Pi. Therefore, the value of codeword "110" is decoded using a TR de-binarization and after decoding, is equal to two.

If the Rice Parameter is greater than zero, the codeword consists of the quotient part and a remainder part. The quotient part is coded using a TR binarization based on the aforementioned method. The remainder part is then generated based on bit string pattern 2 in binary format after the quotient part is generated. The remainder part can be generated by treating the suffix part of the codeword as the binary value. The value of the codeword is then derived by concatenation of the quotient (in binary format) and the remainder. Alternatively, the value of the codeword may also be derived by adding the remainder with a shifted quotient part. For example, the codeword "110 1" for a Rice Parameter equal to one does not contain pattern Pi. The quotient part is equal to 2 (or 2'b10 in binary format) and the remainder part is equal to 1. The value of this codeword is {2'b10, 1'1}=5. Alternatively, the value of this codeword can also be derived by 1+2<<1=5.

Figure 4:
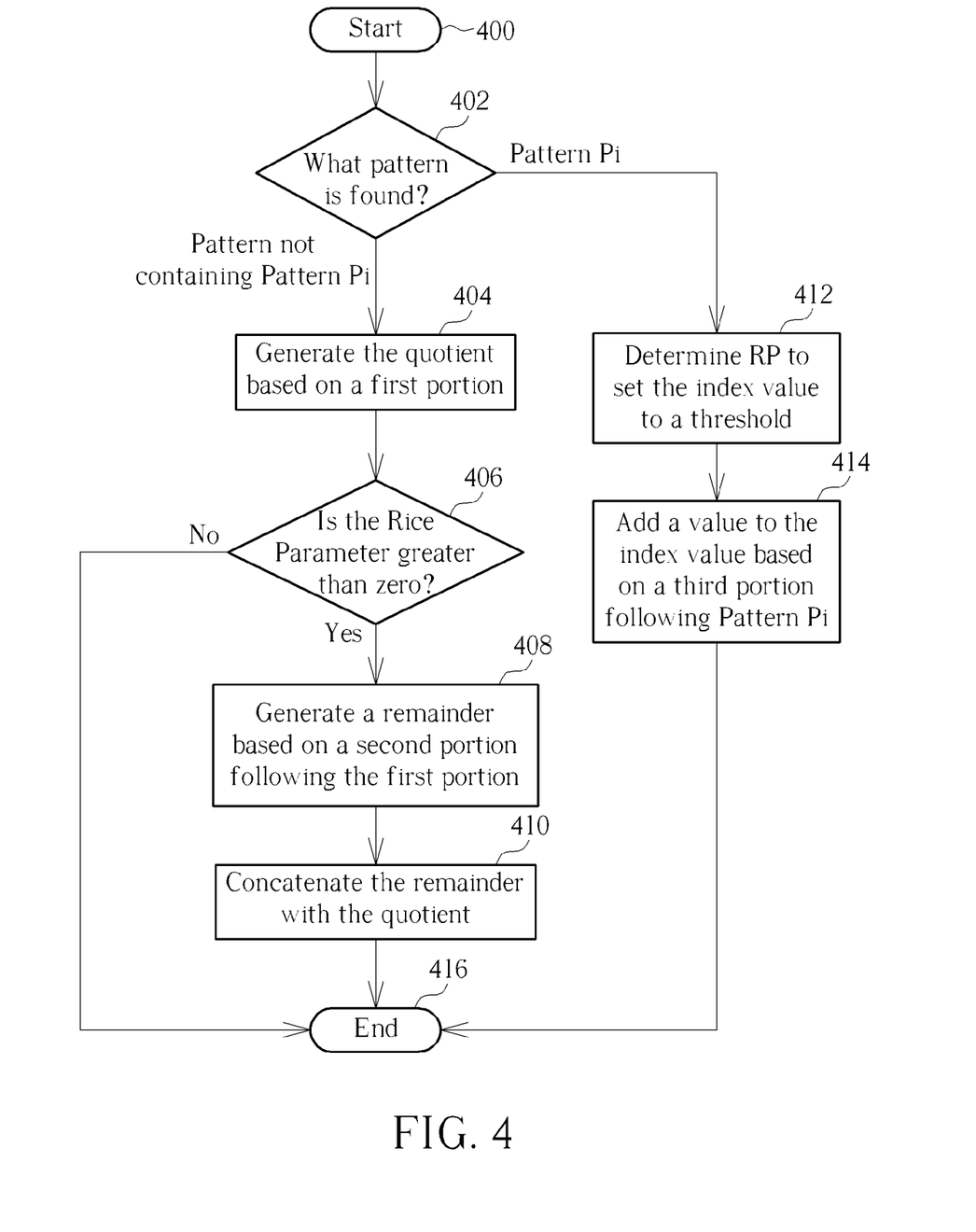
FIG. 4 is a flowchart illustrating a method of decoding a codeword according to an embodiment of the present invention.
Figure 5:
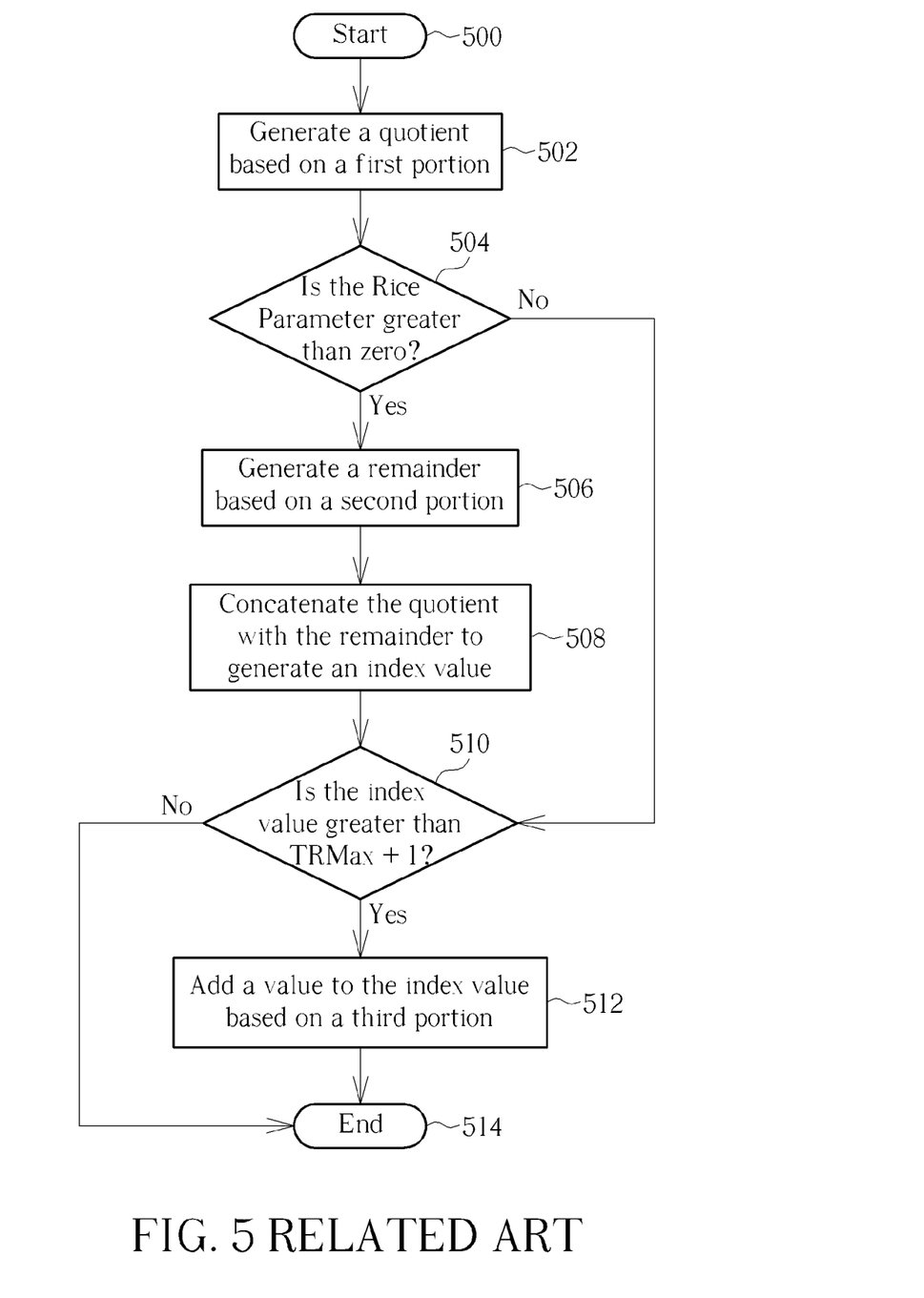
FIG. 5 is a flowchart illustrating a method of decoding a codeword according to the conventional art.

Please refer to FIG. 4 and FIG. 5 which illustrate, respectively, an example of the above-described method and a method for decoding a codeword according to the conventional art. By comparing the two diagrams, it can be seen that the method of the present invention provides two fast methods of decoding a codeword when the index value is equal to or above a defined threshold, which enables more direct decoding as compared to the conventional art.

Step 400: Start;
Step 402: What pattern is found? If the pattern contains a first Pattern Pi, go to Step 412; if the pattern does not contain Pattern Pi, go to Step 404;
Step 404: Generate the quotient based on a first portion;
Step 406: Is the Rice Parameter greater than zero? If yes, go to Step 408; if no, go to Step 416;
Step 408: Generate a remainder based on a second portion following the first portion;
Step 410: Concatenate the remainder with the quotient; go to Step 416;
Step 412: Determine the Rice Parameter (cRP) to set the index value to a threshold corresponding to the Rice Parameter;
Step 414: Add a value to the index value based on a third portion following Pattern Pi;
Step 416: End.

In the above description, Truncated Rice debinarization is applied in the case that the pattern contains a unary pattern as the first portion of the codeword which is not equivalent to Pattern Pi. The second portion of the codeword following the first portion is the non-unary part (i.e. suffix) of a codeword coded using a Truncated Rice binarization. In another case, if the codeword contains Pattern Pi, the third portion is the suffix of the codeword and its value will be decoded by EGk process (step 414). This value will then be added to the index value generated according to the cRP and Pattern Pi. Taking a codeword "1111 0 01" and cRP=1 as an example, this codeword contains Pattern Pi "1111" and its index value corresponding to cRP=1 is 8. The suffix of this codeword is "0 01" and its corresponding value is 1 after EGk de-binarization. Therefore, the codeword "1111 0 01" with cRP=1 represents a value 8+1=9.

As mentioned before, the input can also be coded with three portions of a codeword: a prefix, an EG0, and a suffix. In the case that a codeword "1111 0 01" with cRP=1, Pattern Pi "1111" is found and its EG0 codeword part is '0' which represents 0 after EG0 de-binarization. An offset value is then generated by shifting this value by cRP+1 bits and the result is 0 (0<<2). The suffix is a binary codeword with a length of cRPP+1 bits '01', which represents a value 1. Therefore, the codeword "1111 0 01" with cRP=1 represents a value 8+0+1=9. For another example where the input codeword is '1111 100 00', Pattern Pi "1111" is found and its EG0 codeword part is '100' which represents an offset value 4 (1<<2). The suffix codeword '00' in binary format represents a value 0. Therefore, the codeword '1111 100 00' with cRP=1 represents a value 8+4+0=12.

The codeword "110 1" and cRP=1 is taken as another example. This codeword does not contain pattern Pi. After applying a TR de-binarization process, the quotient and remainder are 2 and 1 respectively. Therefore, the codeword "110 1" with cRP=1 represents a value {2'b 10, 1'b1}=5. When EG0 as illustrated in FIG. 2B is applied, the first portion is a unary pattern which is not equivalent to Pattern Pi. The second portion is the non-unary part (i.e. binary) of a codeword coded using a Truncated Rice binarization.

For comparison, FIG. 5 illustrates a conventional method of decoding a codeword. The steps of FIG. 5 are as follows:
Step 500: Start;
Step 502: Generate a quotient based on a first portion;
Step 504: Is the Rice Parameter greater than zero? If yes, go to Step 506; if no, go to Step 510;
Step 506: Generate a remainder based on a second portion;
Step 508: Concatenate the quotient with the remainder to generate an index value;
Step 510: Is the index value greater than TRMax+1? If yes, go to Step 512; if no, go to Step 514;
Step 512: Add a value to the index value based on a third portion;
Step 514: End.

In the above, the first portion, second portion, and third portion are the same as the portions defined in FIG. 4. By comparing the two diagrams, it can be seen that the step of finding a pattern match (Step 402 of FIG. 4) enables index values for codewords including Pattern Pi to be decoded much faster than in the related art. Further, when the method determines that a first portion is found (i.e. a unary pattern different from Pattern Pi), the decoding method is faster than in the related art, as the method does not need to search for a third portion or determine whether the decoded index value based on the first and second portions is greater than a threshold.

In summary, both encoding and decoding methods are provided for hybrid TR/EGk binarization schemes that result in faster and more efficient coding than the related art methods. The proposed methods can be used in various image/video coding system, such as H265/HEVC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of binarizing an input symbol using a hybrid Truncated Rice/k-th order exp-Golomb binarization scheme with a Rice Parameter, comprising:
   determining a threshold;
   comparing the input symbol with the threshold;
   constructing a codeword using a Truncated Rice (TR) binarization process for the input symbol when a comparison result belongs to a first type of comparison result; and
   constructing a codeword with an initial prefix and a suffix for the input symbol when the comparison result belongs to a second type of comparison result;
   wherein the suffix is constructed using an exp-Golomb binarization process.

2. The method of claim 1, wherein the first type of comparison result indicates that the input symbol is less than the threshold, and the second type of comparison result indicates that the input symbol is equal to or greater than the threshold.

3. The method of claim 1, wherein the threshold is determined based on the Rice Parameter, and the Rice Parameter is updated according to each coded input symbol.

4. The method of claim 1, wherein constructing a codeword using a Truncated Rice (TR) binarization process further comprises constructing a suffix of said codeword using a fixed length coding wherein the bit length for the suffix of the codeword is equal to the Rice Parameter.

5. The method of claim 1, wherein the step of constructing a codeword using TR binarization process comprises:
   forming an initial prefix of ONES, equal to a number according to the input symbol and the Rice Parameter;
   appending one ZERO to the initial prefix;
   determining at least one Least Significant Bit as a suffix by selecting from the least significant bits of the input symbol in binary form, wherein the number of the Least Significant Bits is determined according to the Rice Parameter.

6. The method of claim 1, wherein constructing a codeword using the TR binarization process further comprises:
   constructing a prefix by a lookup table with an input comprising the Rice Parameter.

7. The method of claim 1, wherein the initial prefix of the codeword is constructed independent of the Rice Parameter and the suffix is constructed dependent on the Rice Parameter.

8. The method of claim 1, wherein constructing a codeword with an initial prefix and a suffix for the input symbol further comprises
   determining at least one Least Significant Bit as the suffix by selecting from the least significant bits of the input symbol in binary form, wherein the number of the Least Significant Bits is determined according to the Rice Parameter.

9. The method of claim 1, wherein the step of constructing a codeword comprises:
   generating at least one least significant bit of the codeword by selecting from the least significant bits of the input symbol in binary form, wherein the number of the least significant bits is determined according to the Rice Parameter.

10. The method of claim 1, wherein constructing the suffix by the exp-Golomb binarization process comprises:
    subtracting the threshold from the input symbol.

11. A method for generating an index value from a codeword for digital video coding, comprising:
    determining a Rice Parameter;
    determining whether the codeword contains a first pattern;
    when the codeword contains the first pattern, decoding a remaining part of the codeword by using an exp-Golomb binarization process; and
    when the codeword does not contain the first pattern, decoding the entire codeword using a Truncated Rice (TR) binarization process.

12. The method of claim 11, further comprising:
    when the codeword contains the first pattern, determining a decoded value of the first pattern by determining an offset based on the Rice Parameter; and
    adding the offset to a decoded value of the exp-Golomb binarization process to generate the index value.

13. The method of claim 11, further comprising updating the Rice Parameter based on the generated index value.

14. The method of claim 11, wherein when the codeword does not contain the first pattern, the codeword is decoded using a Truncated Rice (TR) binarization process comprising generating a quotient and a remainder based on the Rice Parameter.

15. The method of claim 11, wherein generating the index value comprising identifying a part of the codeword as a binary number; and
    adding the binary number to a value decoded according to other part of the codeword.

16. A method for generating an index value from a codeword for digital video decoding, comprising the steps of:
    determining a selected threshold in response to a first portion of said codeword having a first pattern, wherein the selected threshold is based on a Rice Parameter;
    generating an offset based on a second pattern in a second portion of the codeword following the first portion in response to the first portion having the first pattern;
    generating a value based on a third pattern in a third portion of the codeword following the second portion in response to the first portion having the first pattern;
    combining the selected threshold, the offset, and the value to generate the index value; and
    updating the Rice Parameter based on the generated index value.

17. The method of claim 16, wherein the value based on the second pattern in the second portion of the codeword is generated based on an exp-Golomb debinarization process.

18. The method of claim 16, wherein the value based on the third pattern in the third portion of the codeword is generated based on binary fixed-length decoding and the length is determined by the Rice Parameter.

19. The method of claim 16, further comprising:
determining if the codeword contains a first pattern; and
decoding the entire codeword using a Truncated Rice (TR) binarization process to generate a quotient and a remainder based on the Rice Parameter when the codeword does not contain the first pattern.

20. The method of claim 16, further comprising:
determining if the codeword contains a first pattern; and
decoding the entire codeword using a Truncated Rice (TR) binarization process when the codeword does not contain the first pattern, wherein said decoding comprises identifying a part of the codeword as a binary number and adding the binary number to a value generated according to another part of the codeword.

* * * * *